(12) United States Patent
Bhagat et al.

(10) Patent No.: US 10,467,246 B2
(45) Date of Patent: Nov. 5, 2019

(54) CONTENT-BASED REPLICATION OF DATA IN SCALE OUT SYSTEM

(71) Applicant: HEWLETT PACKARD ENTERPRISE DEVELOPMENT LP, Houston, TX (US)

(72) Inventors: Nimesh Bhagat, San Jose, CA (US); Tomasz Barszczak, San Jose, CA (US); Gurunatha Karaje, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 359 days.

(21) Appl. No.: 14/950,482

(22) Filed: Nov. 24, 2015

(65) Prior Publication Data

US 2016/0147855 A1 May 26, 2016

Related U.S. Application Data

(60) Provisional application No. 62/084,395, filed on Nov. 25, 2014, provisional application No. 62/084,403, filed on Nov. 25, 2014.

(51) Int. Cl.
*G06F 16/27* (2019.01)
*G06F 16/22* (2019.01)
(Continued)

(52) U.S. Cl.
CPC .............. *G06F 16/27* (2019.01); *G06F 3/065* (2013.01); *G06F 3/067* (2013.01); *G06F 3/0607* (2013.01);
(Continued)

(58) Field of Classification Search
CPC combination set(s) only.
See application file for complete search history.

(56) References Cited

U.S. PATENT DOCUMENTS 6,292,795 B1 * 9/2001 Peters ............... G06F 17/30097
7,739,233 B1    6/2010 Ghemawat et al.
(Continued)

OTHER PUBLICATIONS

International Search Report & Written Opinion received in PCT Application No. PCT/US2014/054349, dated Mar. 2 2015, 11 pages.
(Continued)

*Primary Examiner* — Etienne P Leroux

(57) ABSTRACT

Methods, systems, and programs are presented for replicating data across scale-out storage systems. One method includes replicating, from an upstream to a downstream system, a volume snapshot having one or more bins. Locations for the bins of the snapshot are identified, the location for each bin including the upstream array storing the bin and the downstream array storing a replicated version of the bin. Each bin is validated by comparing an upstream bin checksum of the bin with a downstream bin checksum of the replicated version of the bin. When the checksums are different, a plurality of chunks are defined in the bin, and for each chunk in the bin an upstream chunk checksum calculated by the upstream array is compared with a downstream chunk checksum calculated by the downstream array. The chunk is sent from the upstream to the downstream array when the chunk checksums are different.

20 Claims, 12 Drawing Sheets

(51) Int. Cl.
G06F 16/23 (2019.01)
G06F 3/06 (2006.01)
H04L 29/08 (2006.01)
G06F 16/182 (2019.01)

(52) U.S. Cl.
CPC .......... *G06F 3/0619* (2013.01); *G06F 3/0689* (2013.01); *G06F 16/1844* (2019.01); *G06F 16/2237* (2019.01); *G06F 16/2365* (2019.01); *H04L 67/1095* (2013.01); *H04L 67/1097* (2013.01)

(56) References Cited

U.S. PATENT DOCUMENTS

| | | | |
|---|---|---|---|
| 7,814,074 | B2 | 10/2010 | Anglin et al. |
| 7,836,387 | B1 | 11/2010 | Wong et al. |
| 7,895,501 | B2 | 2/2011 | Brown |
| 8,060,812 | B2 * | 11/2011 | Branda ............... G06F 11/1004 711/118 |
| 8,931,054 | B2 * | 1/2015 | Huynh ................. G06F 3/0622 380/44 |
| 9,424,130 | B2 * | 8/2016 | Resch .................. G06F 12/023 |
| 9,697,268 | B1 * | 7/2017 | Prater ............... G06F 17/30575 |
| 9,740,583 | B1 | 8/2017 | Brandwine |
| 9,767,106 | B1 | 9/2017 | Duggal et al. |
| 2008/0071867 | A1 | 3/2008 | Pearson et al. |
| 2010/0179941 | A1 | 7/2010 | Agrawal et al. |
| 2011/0099148 | A1 | 4/2011 | Bruning, III |
| 2012/0239778 | A1 | 9/2012 | Wang |
| 2012/0303593 | A1 * | 11/2012 | Calder ............. G06F 17/30575 707/691 |
| 2012/0317079 | A1 | 12/2012 | Shoens et al. |
| 2013/0007366 | A1 | 1/2013 | Garmiza et al. |
| 2013/0054523 | A1 | 2/2013 | Anglin et al. |
| 2013/0066952 | A1 * | 3/2013 | Colrain ............... G06F 11/1438 709/203 |
| 2013/0138607 | A1 | 5/2013 | Bashyam et al. |
| 2013/0166862 | A1 | 6/2013 | Huang |
| 2013/0173547 | A1 | 7/2013 | Cline et al. |
| 2013/0325824 | A1 | 12/2013 | Shoens |
| 2014/0074777 | A1 | 3/2014 | Agrawal |
| 2014/0195636 | A1 * | 7/2014 | Karve ................... G06F 3/0619 709/215 |
| 2014/0201153 | A1 | 7/2014 | Vijayan et al. |
| 2016/0150012 | A1 | 5/2016 | Barszczak et al. |
| 2016/0294788 | A1 * | 10/2016 | Mahajan ............. H04L 63/0428 |
| 2017/0193004 | A1 | 7/2017 | Karuppusamy et al. |

OTHER PUBLICATIONS

Kolano, P .Z., "High Performance Reliable File Transfers Using Automatic Many-to-Many Parallelization," (Research Paper), Aug. 28, 2012, 10 pages. http://people.nas.nasa.gov/~kolano/papers/resilience12.pdf.

Microsoft, "DFS Replication: Copying Files to Preseed or Stage Initial Synchronization," Dec. 12, 2013, 3 pages. https://technet.microsoft.com/en-us/library/dn495052.aspx.

Poitras, S., "The Nutanix Bible," Feb. 11, 2014, pp. 1-39, http://web.archive.org/web/20140211222201/http://stevenpoitras.com:80/the-nutanix-bible.

\* cited by examiner

CONTENT-BASED REPLICATION OF DATA IN SCALE OUT SYSTEM

CLAIM OF PRIORITY

This application claims priority from U.S. Provisional Patent Application No. 62/084,395, filed Nov. 25, 2014, entitled "Content-Based Replication of Data Between Storage Units," and from U.S. Provisional Patent Application No. 62/084,403, filed Nov. 25, 2014, entitled "Content-Based Replication of Data in Scale Out System." These provisional applications are herein incorporated by reference.

CROSS REFERENCE TO RELATED APPLICATIONS

This application is related by subject matter to U.S. patent application Ser. No. 14/950,456 filed on the same day as the instant application and entitled "Content-Based Replication of Data Between Storage Units", which is incorporated herein by reference.

BACKGROUND

1. Field of the Invention

The present embodiments relate to methods, systems, and programs for replicating data in a scale-out networked storage system.

2. Description of the Related Art

Network storage, also referred to as network storage systems or storage systems, is computer data storage connected to a computer network providing data access to heterogeneous clients. Typically network storage systems process a large amount of Input/Output (TO) requests, and high availability, speed, and reliability are desirable characteristics of network storage.

Sometimes data is copied from one system to another, such as when an organization upgrades to a new data storage device, when backing up data to a different location, or when backing up data for the purpose of disaster recovery. The data needs to be migrated or replicated to the new device from the old device.

However, when transferring large volumes of data, there could be some glitches during the transfer/replication process, and some of the data may be improperly transferred. It may be very expensive resource wise to retransfer all the data, because it may take a large amount of processor and network resources that may impact the ongoing operation of the data service. Also, when data is being replicated to a different storage system, there could be a previous snapshot of the data in both systems. If a change is detected between snapshots being replicated, it may be very expensive to transmit over the network large amounts of data if only a small portion of the data has changed. Further yet, if a common base snapshot is lost, resending all the data may be very expensive.

What is needed is a network storage device, software, and systems that provide verification of the correct transfer of large amounts of data from one system to another, as well as ways to correct errors found during the replication process.

It is in this context that embodiments arise.

SUMMARY

Methods, devices, systems, and computer programs are presented for replicating data in a scale-out networked storage system. It should be appreciated that the present embodiments can be implemented in numerous ways, such as a method, an apparatus, a system, a device, or a computer program on a computer readable medium. Several embodiments are described below.

One general aspect includes a method for replicating data across storage systems. The method includes an operation for replicating a snapshot of a volume from an upstream system to a downstream system, the volume being a predefined logical storage area. The snapshot includes one or more bins, the upstream system includes one or more upstream arrays, and the downstream system including one or more downstream arrays. The method also includes an operation for identifying locations for the bins of the snapshot, the location for each bin including the upstream array storing the bin and the downstream array storing a replicated version of the bin. The method further includes an operation for validating each bin by comparing an upstream bin checksum of the bin calculated by the corresponding upstream array with a downstream bin checksum of the replicated version of the bin calculated by the corresponding downstream array. When the upstream bin checksum is different from the downstream bin checksum, a plurality of chunks is defined in the bin. For each chunk in the bin, an upstream chunk checksum calculated by the upstream array is compared with a downstream chunk checksum calculated by the downstream array, and when the upstream chunk checksum is different from the downstream chunk checksum the data of the chunk is sent from the upstream array to the downstream array.

One general aspect includes a method for replicating data across storage systems. The method includes an operation for replicating the snapshot of a volume from an upstream system to a downstream system, the volume being a predefined logical storage area, the snapshot including one or more bins, and each bin including one or more slices. The upstream system includes one or more upstream arrays and the downstream system including one or more downstream arrays. The method also includes an operation for identifying locations for the bins of the snapshot, the location for each bin including the upstream array storing the bin and the downstream array storing a replicated version of the bin. The method also includes an operation for validating each bin by comparing an upstream bin checksum of the bin calculated by the corresponding upstream array with a downstream bin checksum of the replicated version of the bin calculated by the corresponding downstream array. When the upstream bin checksum is different from the downstream bin checksum, for each slice in the bin, an upstream slice checksum calculated by the upstream array is compared with a downstream slice checksum calculated by the downstream array. When the upstream slice checksum is different from the downstream slice checksum, a plurality of chunks is defined in the slice. For each chunk in the slice, an upstream chunk checksum calculated by the upstream array is compared with a downstream chunk checksum calculated by the downstream array. When the upstream chunk checksum is different from the downstream chunk checksum, data of the chunk is sent from the upstream array to the downstream array.

One general aspect includes a non-transitory computer-readable storage medium storing a computer program for replicating data across storage systems. The computer-readable storage medium includes program instructions for replicating a snapshot of a volume from an upstream system to a downstream system. The volume is a predefined logical storage area, the snapshot including one or more bins, the upstream system including one or more upstream arrays and the downstream system including one or more downstream arrays. The storage medium also includes program instructions for identifying locations for the bins of the snapshot, the location for each bin including the upstream array storing the bin and the downstream array storing a replicated version of the bin. The storage medium also includes program instructions for validating each bin by comparing an upstream bin checksum of the bin calculated by the corresponding upstream array with a downstream bin checksum of the replicated version of the bin calculated by the corresponding downstream array. The storage medium also includes program instructions for defining a plurality of chunks in the bin when the upstream bin checksum is different from the downstream bin checksum. For each chunk in the bin, an upstream chunk checksum calculated by the upstream array is compared with a downstream chunk checksum calculated by the downstream array, and when the upstream chunk checksum is different from the downstream chunk checksum, data of the chunk is sent from the upstream array to the downstream array.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, devices, systems, and computer programs for replicating data across storage systems in a scale out configuration. It will be apparent, that the present embodiments may be practiced without some or all of these specific details. In other instances, well-known process operations have not been described in detail in order not to unnecessarily obscure the present embodiments.

The present embodiments relate to fixing problems when data is replicated from a first system to a second system in a scale-out environment. In some implementations, a Snapshot Delta Replication (SDR) method is used to replicate snapshots. However, something could go wrong during the replication, therefore, a check may be made to determine if the replicated snapshot is correct or if it should be corrected. In order to avoid having to replicate all the data again, a Content-Based Replication (CBR) method is used to minimize the amount of data needed to correct the replicated snapshot.

With CBR, volume checksums are made at the upstream system (system being replicated) and the downstream system (systems where the replicated data will be kept), or bin checksums at upstream arrays and downstream arrays. If the checksums do not match, the volume is divided into pieces of data, and then checksums are performed to validate these pieces. The process may be iterated when errors are found for smaller pieces of data. If corresponding pair of checksums for the same data do not match at the upstream and the downstream arrays, then the upstream array resends the corresponding data to the downstream array.

In scale-out systems, volumes are striped across multiple arrays and logically organized in bins. When Content-based Replication (CBR) is used to correct replicated volumes in a scale out system, CBR is modified to take into account where the upstream data and the downstream data is located. It is possible that the data stored in an upstream array may be located in two or more different downstream arrays. Therefore, the upstream and downstream arrays must know the location of the data in order to perform CBR. CBR keeps track of the upstream and downstream volumes and the location where the data for a volume is stored. In one embodiment, the pieces of data are bins use to spread out the volume across arrays in a pool. When copying the data from the upstream to the downstream array, CBR determines for any given bin, what is the upstream array and what is the downstream array. Then the upstream array and the downstream array perform CBR for each shared bin. The method is repeated for all the bins to complete the replication validation.

Figure 1:
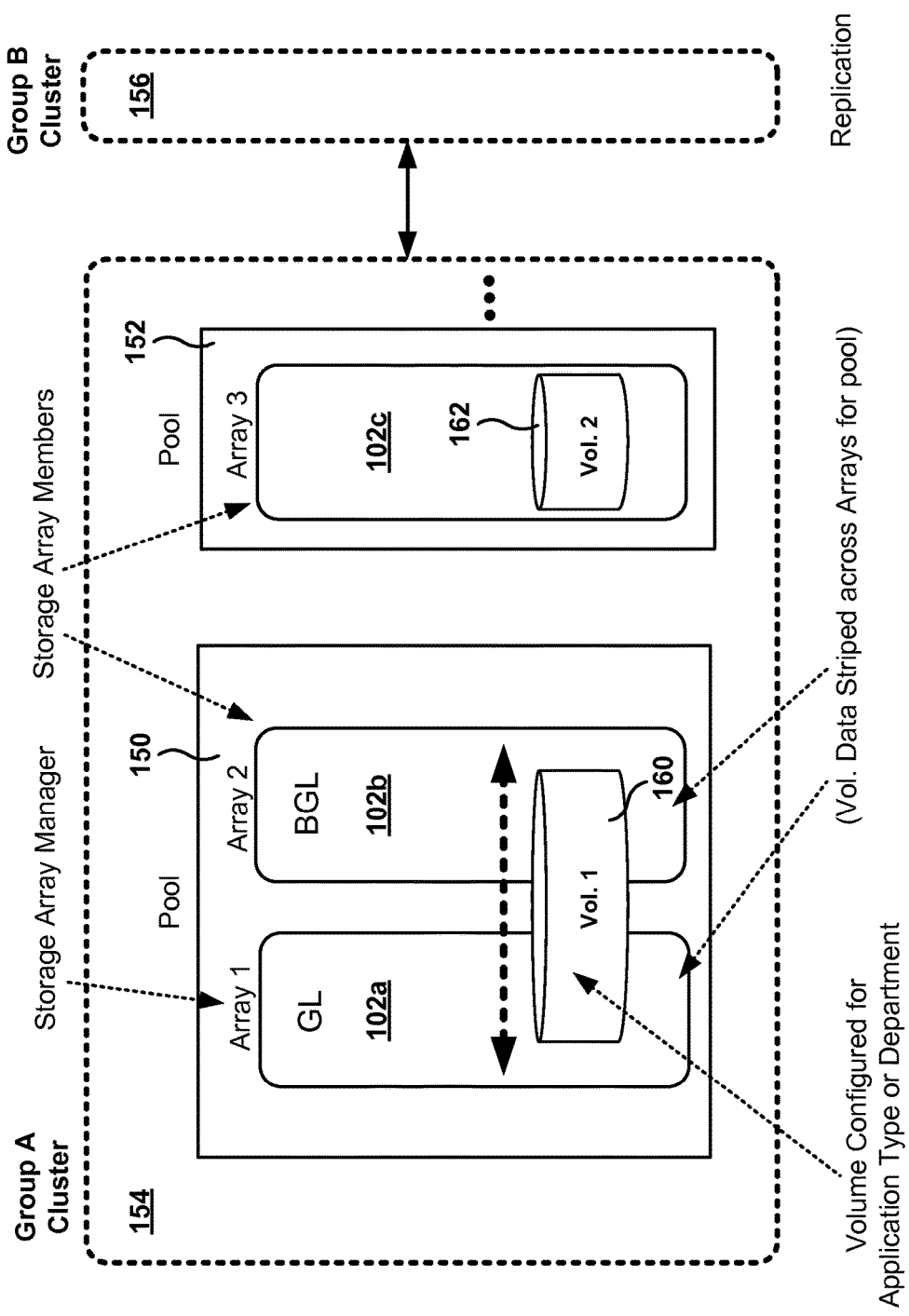
FIG. 1 illustrates an example of a configuration where multiple arrays can be made part of a group (i.e., a cluster), in accordance with one embodiment of the present invention.

FIG. 1 illustrates an example of a configuration where multiple arrays can be made part of a group (i.e., a cluster), in accordance with one embodiment of the present invention. In one embodiment, a volume 160 is a single accessible storage area, reserved for one application or one host, or for a group of users of an organization or to segment/separate types of data for security or accessibly. Volumes may be referred to herein as flows, as a flow is associated with a type of data or application, which is configured for a volume. In one embodiment, the data of the volume is divided into blocks, and the data from the volume is accessed by identifying a block (e.g., identifying an offset associated with the block being retrieved). That is, data from the volume is accessed by the host in units of a size of the block, and the block is the smallest amount of data that can be requested from the volume. The networked storage device where the data is stored is also referred to herein as a storage array or a storage system.

In this example, a group 154 is configured by storage arrays 102a, 102b, and 102c that have also been associated with pools 150 and 152. For example, array 102a and array 102b are associated with pool 150. Arrays 102a and 102b of pool 150 are configured with volume 1 1601 and array 102c is configured in pool 152 for managing volume 2 162. Pool 152 that currently contains volume 162, can be grown by adding additional arrays to increase performance and storage capacity. Further illustrated is the ability to replicate a particular group, such as group A 154 to group B 156, while maintaining the configuration settings for the pools and volumes associated with group A. A replica of a volume is a complete copy of the data of the volume to another volume, referred to as the replicated volume.

As shown, a volume can be configured to span multiple storage arrays of a storage pool. In this configuration, arrays in a volume are members of a storage pool. In one example, if an array is added to a group and the array if not specified to a particular pool, the array will be made a member of a default storage pool. For instance, in FIG. 1, the default storage pool may be pool 150 that includes array 102a and array 102b. In one embodiment, pools can be used to separate organizational sensitive data, such as finance and human resources to meet security requirements. In additional to pooling by organization, pooling can also be made by application type. In some embodiments, it is possible to selectively migrate volumes from one pool to another pool. The migration of pools can include migration of their associated snapshots, and volumes can support reads/writes during migration processes. In yet another feature, existing pools can add arrays to boost performance and storage capacity or evacuate arrays from existing pools (e.g., when storage and/or performance is no longer needed or when one array is being replaced with another array). Still further, logic in the storage OS allows for merging of pools of a group. This is useful when combining storage resources that were previously in separate pools, thus increasing performance scaling across multiple arrays.

The difference between groups and storage pools is that groups aggregate arrays for management while storage pools aggregate arrays for capacity and performance. As noted above, some operations on storage pools may include creating and deleting storage pools, adding and removing arrays to or from storage pools, merging storage pools, and the like. In one example, a command line may be provided to access a particular pool, which allows management of multiple storage arrays via the command line (CLI) interface. In one embodiment, a scale-out set up can be created by either performing a group merge or adding an array. A group merge is meant to merge two arrays that are already set up and have objects and data stored thereon. The merge process ensures that there are no duplicate objects and the merge adheres to other rules around replication, online volumes, etc. Multi-array groups can also be created by adding an underutilized array to another existing array.

In one embodiment, storage pools are rebalanced when storage objects such as arrays, pools and volumes are added, removed or merged. Rebalancing is a non-disruptive low-impact process that allows application IO to continue uninterrupted even to the data sets during migration. Pool rebalancing gives highest priority to active data IO and performs the rebalancing process with a lower priority.

As noted, a group may be associated with several arrays, and at least one array is designated as the group leader (GL) (e.g., 102a). The group leader 102a has the configuration files and data that it maintains to manage the group of arrays. In one embodiment, a backup group leader (BGL) 102b may be identified as one of the members of the storage arrays. Thus, the GL is the storage array manager, while the other arrays of the group are member arrays. In some cases, the GL may be migrated to another member array in case of a failure or possible failure at the array operating as the GL.

As the configuration files are replicated at the BGL, the BGL is the one that takes the role as a new GL and another member array is designated as the BGL. In one embodiment, volumes are striped across a particular pool of arrays. As noted, group configuration data (configuration files and data managed by a GL) is stored in a common location and is replicated to the BGL.

In one embodiment, only a single management IP (Internet Protocol) address is used to access the group. Benefits of a centrally managed group include single volume collections across the group, snapshot and replication schedules spanning the group, added level of security by creating pools, shared access control lists (ACLs), high availability, and general array administration that operates at the group level and CLI command access to the specific group.

In one implementation, the storage scale-out architecture allows management of a storage cluster that spreads volumes and their IO requests between multiple arrays. A host cannot assume that a volume can be accessed through specific paths to one specific array or another. Instead of advertising all of the iSCSI interfaces on the array, the disclosed storage scale-out clusters advertise one IP address (e.g., iSCSI discovery). Volume IO requests are redirected to the appropriate array by leveraging deep integration with the host operating system platforms (e.g., Microsoft, VMware, etc.), or using iSCSI redirection.

Figure 2:
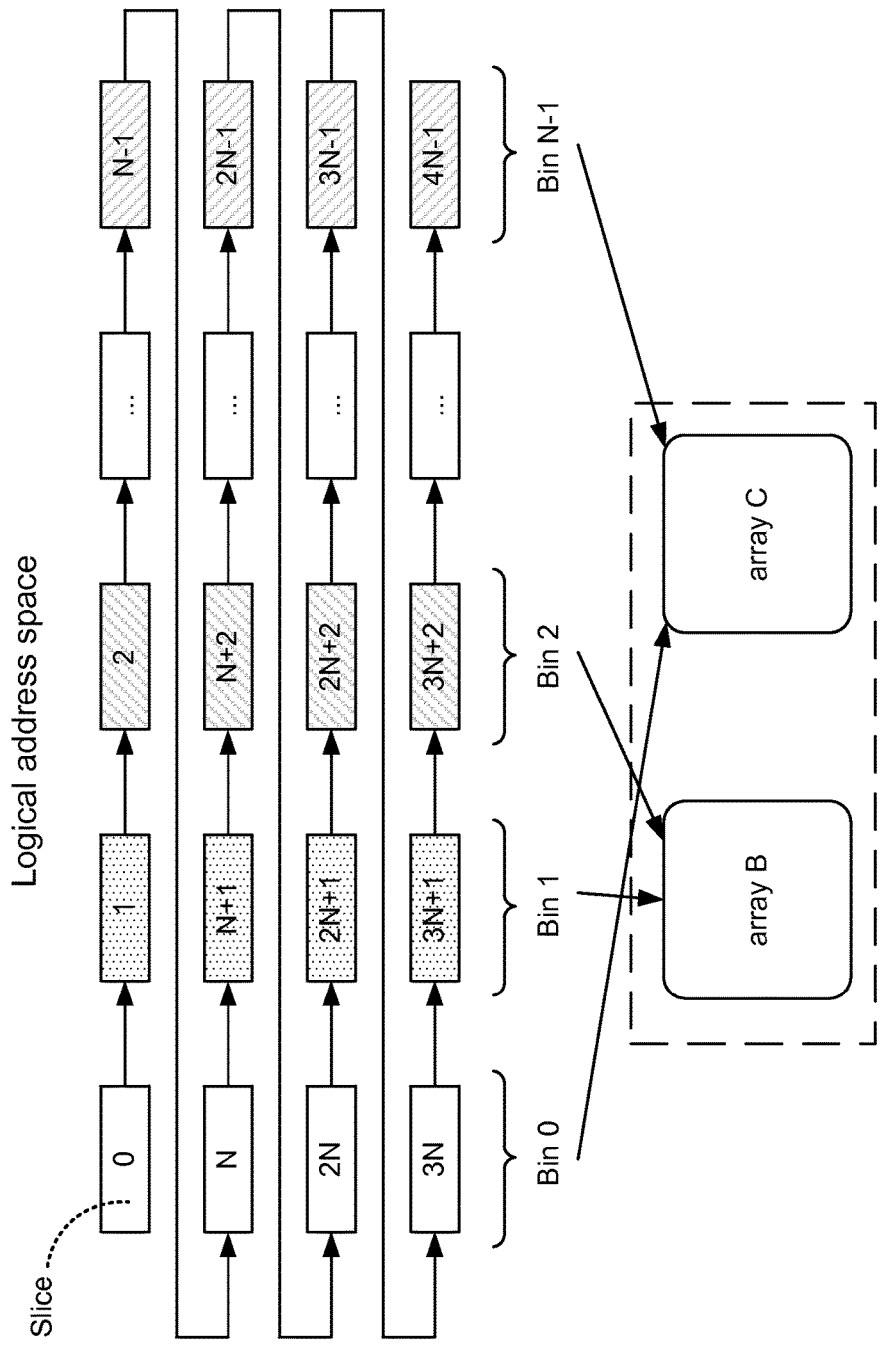
FIG. 2 illustrates the striping of a volume across a plurality of storage arrays, according to one embodiment.

FIG. 2 illustrates the striping of a volume across a plurality of storage arrays, according to one embodiment. It is noted that, in one embodiment, the volume is divided into blocks and the data from the volume is accessed by identifying a block (e.g., identifying an offset associated with the block being retrieved). In one embodiment, the size of a block may be 4K, but other values are also possible, such as in the range from 256 bytes to 50K or more.

A chunk (e.g., 16 Megabytes) is usually much larger than a block, so the chunk includes a plurality of blocks. In one embodiment, the chunk is not addressable for accessing data from the volume and the chunk is only utilized for correcting the replication of snapshots, as described in more detail below. Other embodiments may include other sizes for chunks, such as in the range of 1 megabyte to 100 megabytes, or in the range of 100 megabytes to 1 or several gigabytes. In one embodiment, the size of the chunk is 100 times the size of the block, but other multipliers may also be possible, such as 50 to 5000. Therefore, the size of the chunk may be 50 to 5000 times bigger than the size of the block.

In one embodiment, the volume may be striped across multiple arrays in a scale-out solution, e.g., the data of the volume is saved in multiple storage arrays. The logical address space of the volume is divided into slices and bins. A slice is a data unit that includes a plurality of blocks, and each slice has a fixed size (e.g., 16 Megabytes (MB), but other values are also possible in the range from 1 MB to 500 MB or more). The volume is also divided into a plurality of N bins, and each bin includes one or more slices. The bin is the unit for rebalancing data across multiple arrays. Further, in one embodiment, the slice is divided into a plurality of chunks, as described in more detail below.

To distribute the data uniformly across the different arrays, the slices are stored in increasing order in each of the different arrays. For example, if the slices are numbered with an integer starting at 0 and in increasing order, slice 0 is stored in bin 0, slice 1 is store in bin 1, and so forth until slice (N−1) which is stored in bin (N−1). Then the process repeats by assigning slice N to bin 0, slice (N+1) to bin 1, and so forth.

In the exemplary embodiment of FIG. 2, the logical address space of the volume has been divided into N bins that are stored into two arrays, array B and array C. Since there are more bins than arrays, the bins are stored, in one embodiment, alternating between array B and array C, but other arrangements are also possible, such as assigning the first N/2 bins to array B and the rest to array C.

Figure 3:
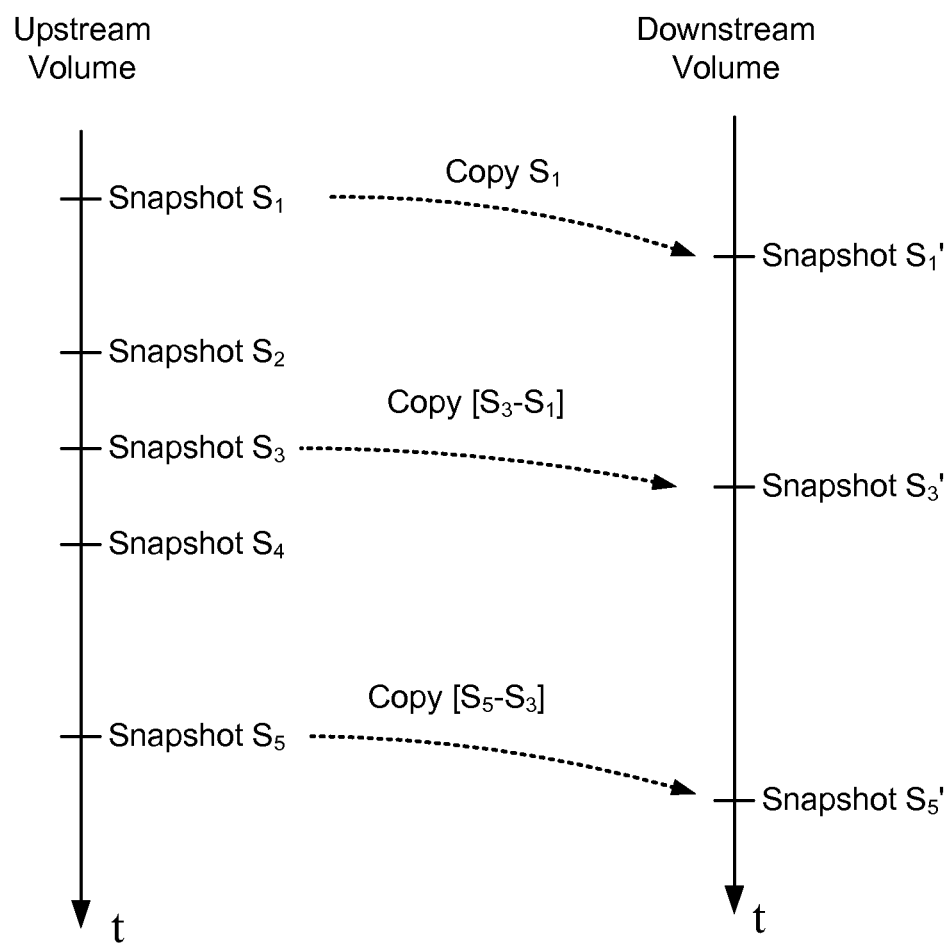
FIG. 3 illustrates the replication of the snapshots from one system to another, according to one embodiment.

FIG. 3 illustrates the replication of the snapshots from one system to another, according to one embodiment. In one embodiment, a first system creates snapshots of a volume over time (e.g., $S_1$, $S_2$, $S_3$, etc.). The volume replicates one or more of the snapshots to a second volume, for example to provide backup of the data in a different location or in a different storage array.

The storage system that holds the source data to be copied is referred to as the upstream system (which may include one more arrays), or the base storage system, and the storage system that receives a copy of the data is referred to as the downstream system (which may include one more arrays). The arrays in the upstream system are referred to as upstream arrays, and the arrays in the downstream system are referred to as downstream arrays. When SDR is in the process of replicating a snapshot to create a replicated snapshot in another storage system, a determination is made of what blocks need to be transferred. SDR uses a base snapshot that is already present on the downstream as well as on the upstream. This common snapshot is also referred to as the common ancestor snapshot. After SDR is complete, the replicated snapshot is present on both the upstream and the downstream storage systems.

In one embodiment, replication means copying all the data from the upstream volume to the downstream volume. In some embodiments, if the common ancestor snapshot of the volume has already been replicated, the replication of a later snapshot includes copying only the data that has changed, which is also referred to herein as the delta data or the difference between the two snapshots. It is noted that not all the snapshots in the upstream volume have to be replicated to the downstream volume.

For example, in the exemplary embodiment of FIG. 3, the upstream volume has over time generated five snapshots, $S_1$, $S_2$, $S_3$, $S_4$, and $S_5$. The replication policy specifies that every other snapshot in the upstream volume is to be copied to the downstream volume. Therefore, the downstream volume has replicated snapshots $S_1'$, $S_3'$, and $S_5'$. As used herein, the snapshots with the apostrophe mark refer to the data in the downstream system.

Replicating snapshot $S_1$ requires copying all the data from $S_1$ to $S_1'$ because there are no previous snapshots that have been replicated. However, replicating snapshot $S_3$ requires only copying the difference between $S_3$ and $S_1$ [$S_3$-$S_1$]. In one embodiment, this method for replicating snapshots from the upstream to the downstream volume by copying the difference between two snapshots in time is referred to herein as snapshot delta replication (SDR).

Sometimes, SDR is an efficient process, but other times SDR is very inefficient. For example, in one scenario, two blocks, $B_1$ and $B_2$ are written to the volume after snapshot $S_1$ is taken but before snapshot $S_3$ is taken. If SDR is performed for snapshot $S_3$ using snapshot $S_1$ as the common snapshot, only blocks $B_1$ and $B_2$ will be replicated (i.e., transmitted to the downstream system) and SDR is efficient in this case. However, if for some reason, snapshot $S_1$ is not available in the downstream system, then SDR would be inefficient as the complete volume would have to be transmitted to the downstream system.

Figure 4A:
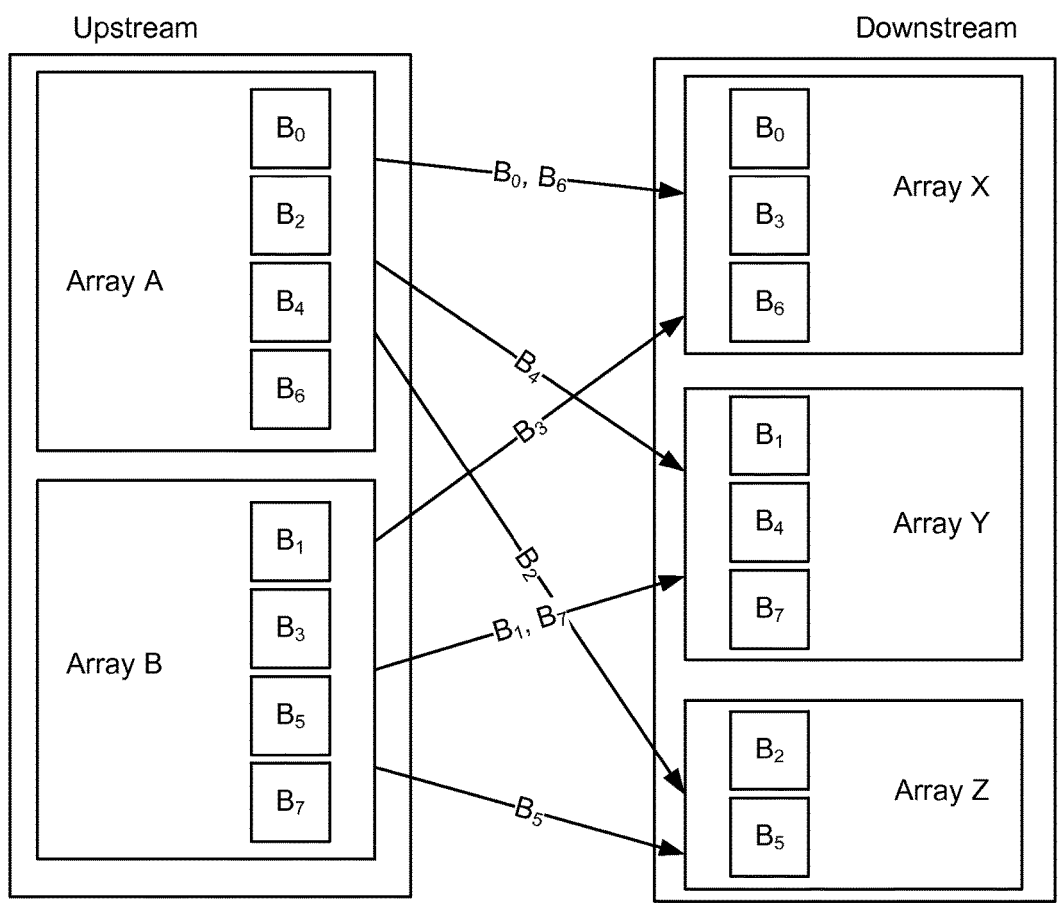
FIGS. 4A-4B illustrate the dispersion of bins in a scale out system when replicating a volume, according to one embodiment.
Figure 4B:
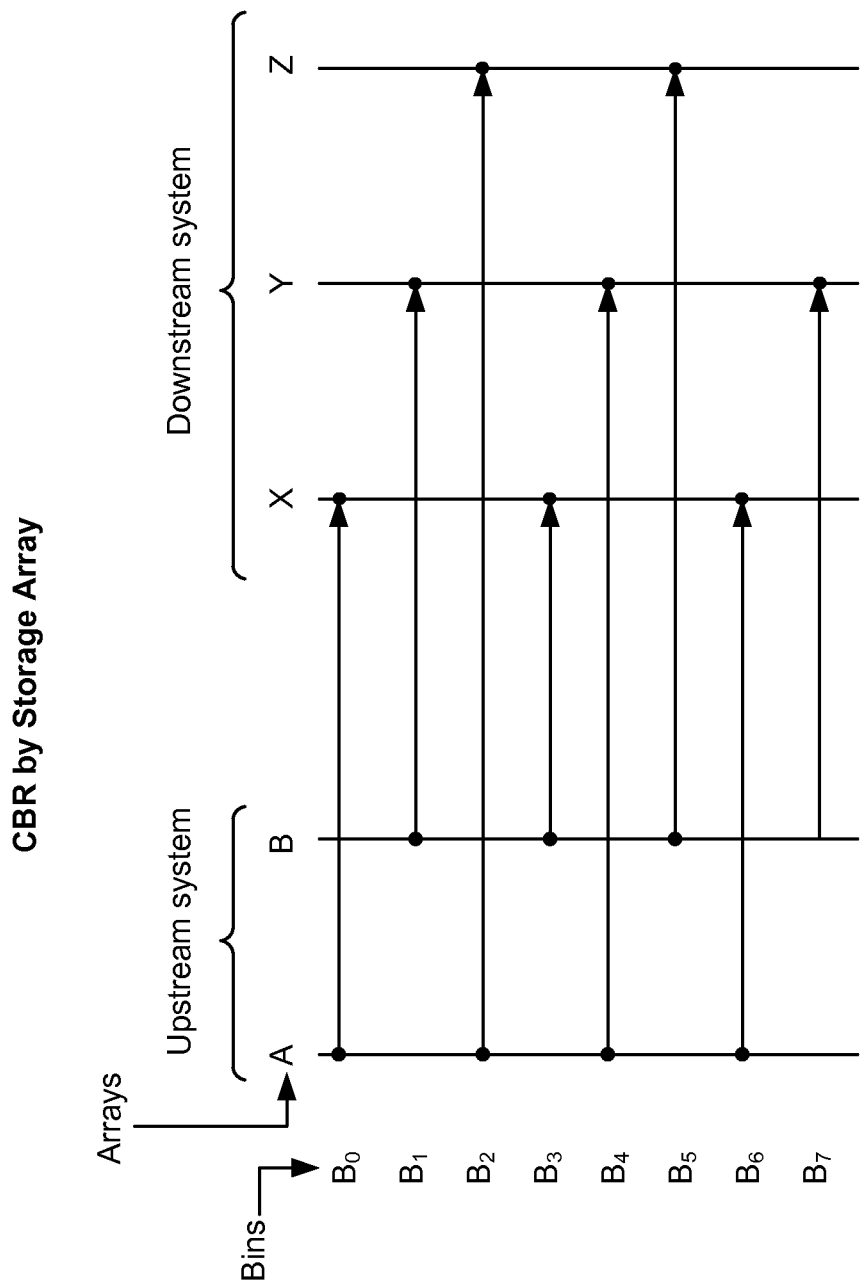

FIGS. 4A-4B illustrate the dispersion of bins in a scale out system when replicating a volume, according to one embodiment. FIG. 4A illustrates the replication of the volume that has two arrays A and B in the upstream and three arrays X, Y, and Z in the downstream.

A replicated volume has eight bins, from $B_0$ to $B_7$. In the upstream system, array A includes bins $B_0$, $B_2$, $B_4$, and $B_6$, while array B includes bins $B_1$, $B_3$, $B_5$, and $B_7$. The volume has been replicated to a downstream pool of arrays, and the bins have been distributed across arrays X, Y, and Z. Array X includes bins $B_0$, $B_3$, and $B_6$, array Y includes bins $B_1$, $B_4$, and $B_7$, and array Z includes bins $B_2$ and $B_5$.

In order to validate the replication of the volume from the upstream pool to the downstream pool, each array in the upstream needs to work with the corresponding array in the downstream to validate the bins that they have in common. For example, array A cooperates with array X to validate the data in the bins $B_0$ and $B_6$.

The upstream arrays need to know in which downstream arrays the bins are situated, and coordinate the replication validation, or the downstream arrays need to know in which upstream arrays the bins are situated and coordinate the validation operation. Or both the upstream and downstream arrays know the respective locations of the bins and cooperate with each other. In either case, the upstream and the downstream arrays need to cooperate to validate the common bins. Once all the bins are validated, then the volume is validated. To validate all the bins, all the pairs of upstream and downstream arrays having bins in common have to perform a validation operation for those common bins. When all the pairs of upstream and downstream arrays have finished validating their bins, the volume is considered validated.

FIG. 4B illustrates how each bin is validated. In FIG. 4B, a header row includes the names of the arrays in the upstream and the downstream pools, and each row is for one of the volume bins. Each of the horizontal arrows shows how the corresponding bin is validated. Therefore, $B_0$ is validated by the cooperation between arrays A and X, which is illustrated as an arrow that goes from column A to column X. $B_1$ is validated by array B cooperating with array Y, etc.

To validate each of the bins, a content-based replication (CBR) method is utilized. More details are provided below with reference to FIGS. 5 and 6A-6B regarding the methodology for CBR.

Figure 5:
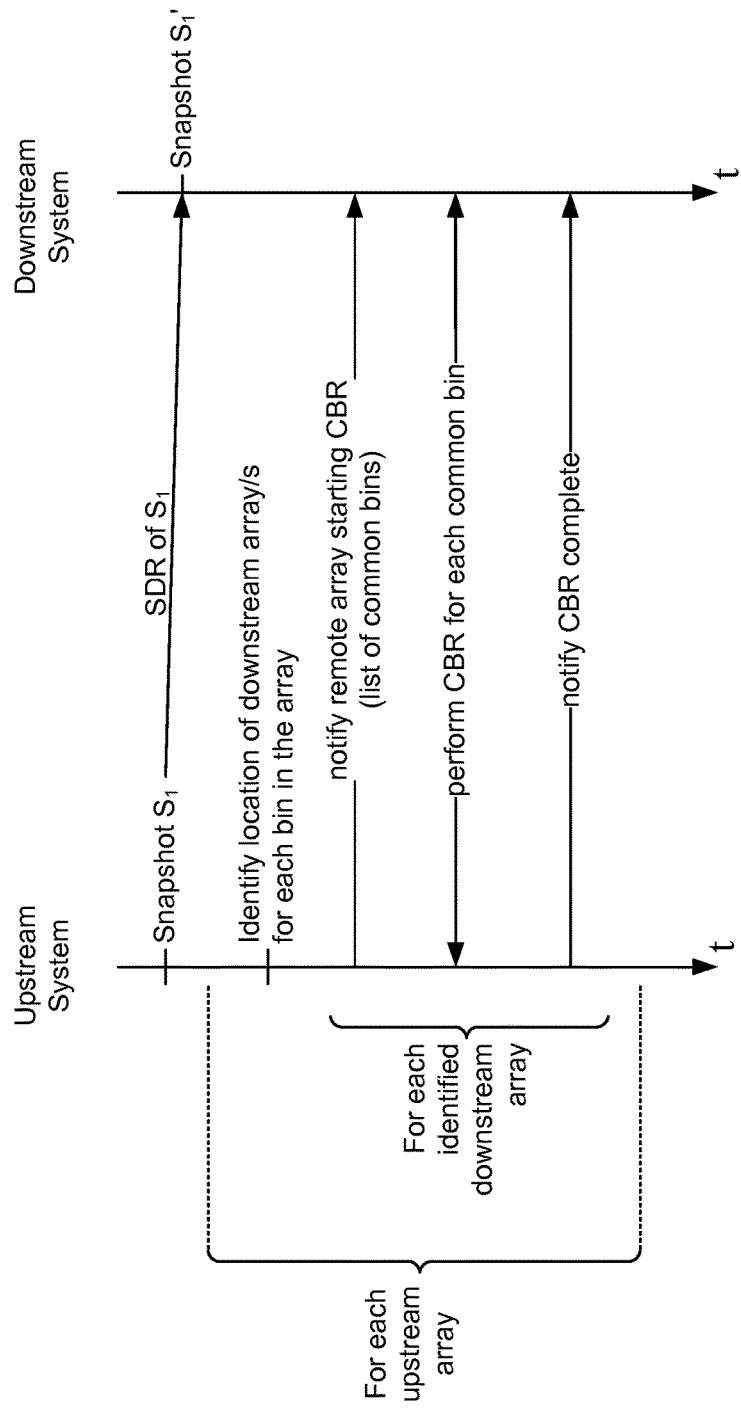
FIG. 5 illustrates the content-based replication (CBR) method for validating volumes and correcting erroneous data between two scale-out systems, according to one embodiment.

FIG. 5 illustrates the content-based replication (CBR) method for validating volumes and correcting erroneous data between two scale-out systems, according to one embodiment. Sometimes, a downstream snapshot is not exactly the same as the upstream snapshot, e.g., because of a failure during the communication of the data from the upstream to the downstream pool.

In one embodiment, a snapshot $S_1$ is copied $S_1'$ from an upstream system to a downstream system. For example, the snapshot can be replicated using the SDR method described above. In one embodiment, the network storage system may limit the CBR process to one volume at a time, in order to limit the stress on the system. In another embodiment, one or more volumes may skip the CBR process if the volumes have been created after a certain time (e.g., time when the storage array was upgraded past a known release with a potential replication problem).

In one embodiment, detecting that the snapshots are not exactly equal may be performed by doing checksums of the upstream and downstream volumes. If the checksums don't match, then there is a problem with the replicated data. An obvious and expensive solution is to recopy all the data again until the checksums match. However, copying large amounts of data repeatedly may cause distress in the data storage system and impact performance. Therefore, this is not the best solution.

In one embodiment, each array of the upstream pool identifies the downstream arrays that host the bins of the volume being validated, and the upstream arrays send the list of bins in common to each downstream array. Each upstream array then works with each of the downstream arrays to validate the bins that they share in common. The upstream array notifies the downstream array that CBR (e.g., the validation process) is starting and provides the list of bins in common. In another embodiment, the downstream arrays identify the list of bins in common with the upstream arrays and the communication goes from the downstream arrays to the upstream arrays.

At the start of the CBR process, the upstream and the downstream arrays may exchange CBR-related information, such as checksum type, checksum size, and how much data is covered by each checksum (e.g., a slice, a chunk, a block, how many blocks to be validated, a cursor of where to start validating).

It is noted that the validation of the snapshots can be initiated in different ways. For example, an administrator may request to a storage array/pool to check for the validity of a snapshot in a downstream volume, or an automated validating process may be initiated by the storage array/pool. For example, a validating process may be initiated periodically or maybe initiated after the data center updates the software of one or more storage arrays, or as additional hardware (e.g., another storage array) is added to the network data system.

In one embodiment, CBR is performed to validate each common bin, until all bins are validated. More details regarding the CBR process are provided below with reference to FIGS. 6A and 6B. After all the common bins have been validated, a message is sent from the upstream array to the downstream array to notify the downstream array that the CBR validation procedure has been completed, or vice versa.

Figure 6A:
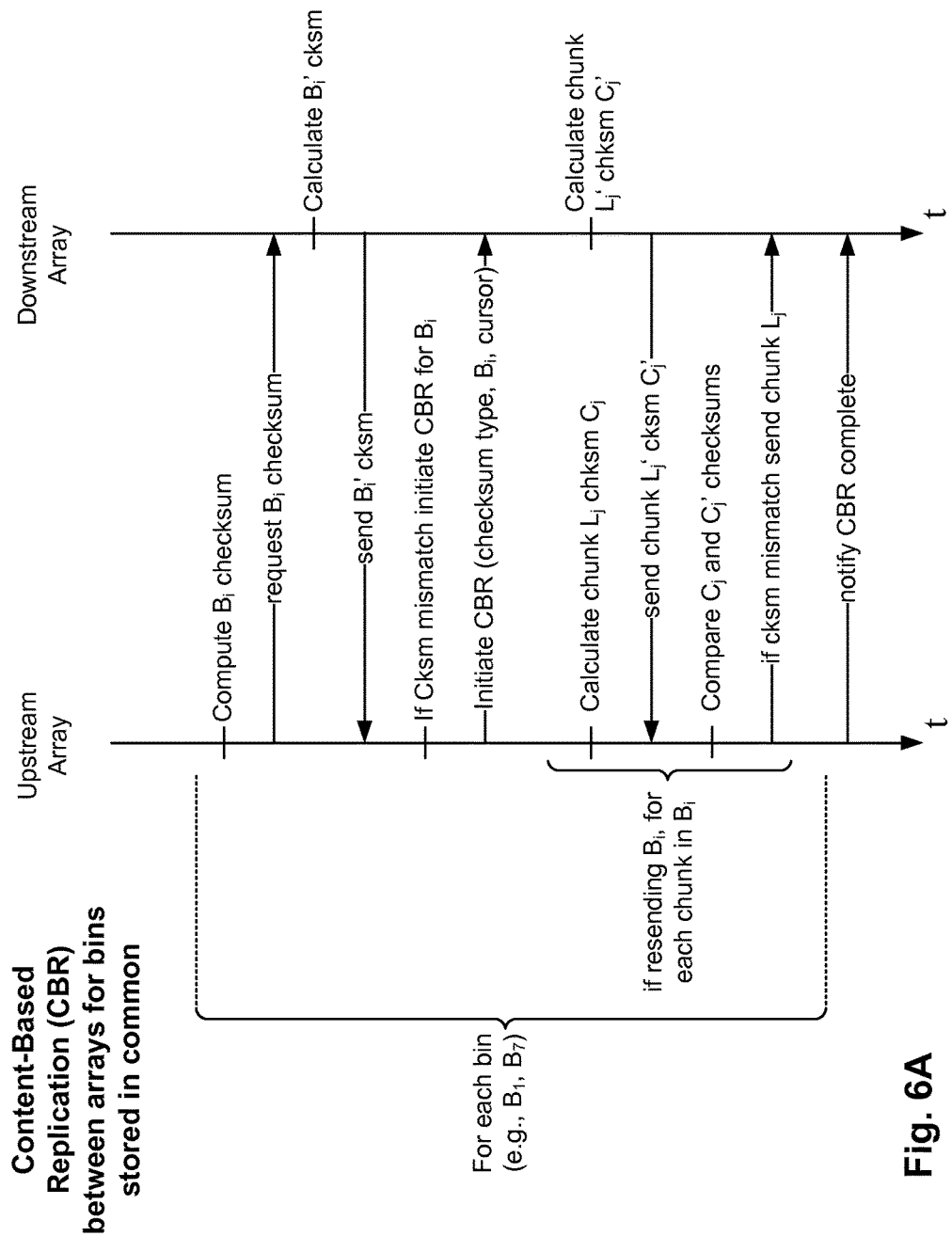
FIG. 6A illustrates the CBR process that includes checking chunk checksums, according to one embodiment.

FIG. 6A illustrates the CBR process that includes checking chunk checksums, according to one embodiment. In one embodiment, each slice in a bin is logically divided into large groups of data, referred to herein as chunks. A chunk is usually much larger than a block (e.g., 16 MB), so the chunk includes a plurality of blocks. In one embodiment, the chunk is not addressable for accessing data from the volume and the chunk is only utilized for correcting the replication of snapshots. Other embodiments may include other sizes for chunks, such as in the range from 1 MB to hundred megabytes, or in the range from hundred megabytes to one or more gigabytes.

In one embodiment, the chunk size is defined to be equal to the slice size, but in other embodiments other chunk sizes may be used. In one embodiment, the upstream array computes the checksum of bin $B_i$ including all slices in bin $B_i$. The upstream array then sends a request to the downstream array to provide the checksum of $B_i'$. In another embodiment, the downstream array initiates the process for comparing the checksums. In general, some of the methods described herein include operations performed by the upstream array (e.g., initiating the validation procedure, comparing checksums, etc.), but the same principles may be applied when the downstream array perform these operations for validating replicated data.

The downstream array then calculates $B_i'$ checksum (or retrieves it from memory if the checksum is already available) and sends it to the upstream array. The upstream array compares the two checksums of $B_i$ and $B_i'$, and if the checksums match that bin is assumed to be correct. However, if the checksums do not match, then the content-based replication CBR process is started for bin $B_i$.

The upstream array sends a request to the downstream array to start the CBR process for $B_i$, and sends information related to the validation, such as the checksum type to be performed, the bin identifier size, and a cursor used to indicate at what chunk to start the CBR process. The cursor is useful in case of a system performing CBR gets interrupted. This way, when the upstream and the downstream volume are ready to continue with the suspended CBR process, the process does not have to be restarted from the beginning but from the place associated with the value of the cursor. In one embodiment, the cursor may be kept in the upstream volume, or in the downstream volume, or in both places.

In one embodiment, instead of keeping the "numbers of bins done" counter, in scale-out systems, the downstream array tracks track which bins have been validated, which means that there is a value stored per bin indicating whether the bin has been validated or not.

To validate a bin with mismatched bin checksums, for each chunk $L_j$ in the bin, the upstream and the downstream volumes calculate the respective chunk checksums $C_j$ and $C_j'$. Then the downstream array sends the $C_j'$ checksum to the upstream array, and the upstream array compares $C_j$ and $C_j'$ checksums. In another embodiment, the checksum is compared by the downstream array, which indicates to the upstream array which blocks to send. If the chunk checksums match, the process continues with the next chunk, until all the chunks are validated. However, if the checksums $C_j$ and $C_j'$ do not match, the upstream storage array sends the data for chunk $L_j$ to the downstream array. If the chunk size is equal to the slice size, then the data for the slice is sent. When the last chunk has been validated, the upstream storage array sends a CBR complete notification message for bin $B_j$ to the downstream array.

It is noted that SDR and CBR may coexist in the same storage array, or even in the same volume, because at different times and under different circumstances one method may be preferred over the other.

It is noted that the checksums performed can be of any type. In one embodiment, a cryptographically strong checksum is utilized. For example, a checksum that requires data read and checksum computation, provides SHA-1, 20-bytes long (e.g., 5 B per TB, if transmitted for every 4K uncompressed block. In another embodiment, 16 bytes encryption is utilized. In another embodiment, the checksum is SHA-2.

Another possible checksum is a Fletcher checksum. Furthermore, several types of checksums may be utilized depending on the size of the data to be checksumed. For example, a Fletcher checksum may be utilized for snapshots, and an SHA-1 checksum may be utilized for slices, chunks, or blocks. In one embodiment, the checksum may be negotiated between the upstream and the downstream storage arrays during the CBR initialization period.

Further, the checksums may be performed over compressed or uncompressed data. In one embodiment, the checksum of uncompressed data is utilized but it requires decompression which causes higher resource utilization. In another embodiment, the checksum is performed over compressed data, however, this option may stop working when compression of blocks starts differing between upstream and downstream (e.g., due to background strong recompression).

While the various operations in this chart are presented and described sequentially, one of ordinary skill will appreciate that some or all of the operations may be executed in a different order, be combined or omitted, or be executed in parallel.

In one embodiment, a per-volume state is maintained to cause a content based replication to occur. The downstream volume's state is consulted during the replication protocol phase that occurs prior to the SDR data transfer phase. If the downstream array indicates the need for content-based replication to occur, the upstream array coordinates with the storage control system to perform CBR. If while conducting content based replication the management process encounters a data error, the upstream array communicates to the downstream array. Once the data transfer phase has completed, the upstream array will include an indication to the downstream, during the snapshot creating phase, as to whether or not content based replication was carried out. This allows the downstream array to update the volume state, which includes clearing a flag that indicates a content based replication is needed, and updating a state to indicate the snapshot ID at which content based replication occurred. Also, the downstream array will issue an alert if the volume record indicates that errors took place (which may be fixed at this point).

In another embodiment, CBR follows the following operations:

Perform snapshot delta replication protocol to replicate a snapshot.

Send message from upstream to downstream, including a bit in the message to indicate that content-based replication is starting, and a snapshot checksum (e.g., Fletcher 32 bits).

Send message from downstream to upstream, including a bit to acknowledge that the downstream system will drive content-based replication. In another embodiment, the upstream system drives CBR. The message also includes the downstream checksum of the snapshot. If the checksums match, the validation is completed. If the checksums do not match, the following operations are performed:

Send message from downstream to upstream, including bin size, checksum type, and checksum size. In one embodiment, send the cursor also. In another embodiment, send the number of bytes covered by the checksum.

Send message from upstream to downstream acknowledging acceptance of the parameters.

Send message from downstream to upstream. For each bin, read the data, compute the checksum, and send the message with the offset and the checksum. The upstream array then reads the corresponding data, computes the checksum, and compares the checksums.

Send message from upstream to downstream, and if the checksums did not match, send compressed data of the bin.

Send message from downstream to upstream indicating end of volume validation.

Send message from upstream to downstream, end of volume validation.

Send message from downstream to upstream acknowledging message and invalidation.

Regarding cursor handling, in one embodiment, the cursor is stored in RAM in the downstream array. In one embodiment, a data structure for the cursor is indexed by volume identifier. In one embodiment, the data structure includes the number of bins fully replicated (for scale out), along with base snapshot and replicated snapshot. The cursor is updated when a new cursor arrives from the upstream array. Further, in one embodiment, this data structure is deleted when a new cursor arrives from upstream. Further, this structure is deleted when CBR finishes successfully.

If CBR upstream and downstream compute checksums and if they don't match the upstream sends data to fix the mismatch. The two states of verification and fixing can be done sequentially or it can be parallelized, for example if checksums of chunks for address 0-16 MB of bin1 do not match, the system will start fixing this range while performing checksum on the next chunk for address 16 MB-32 MB.

Figure 6B:
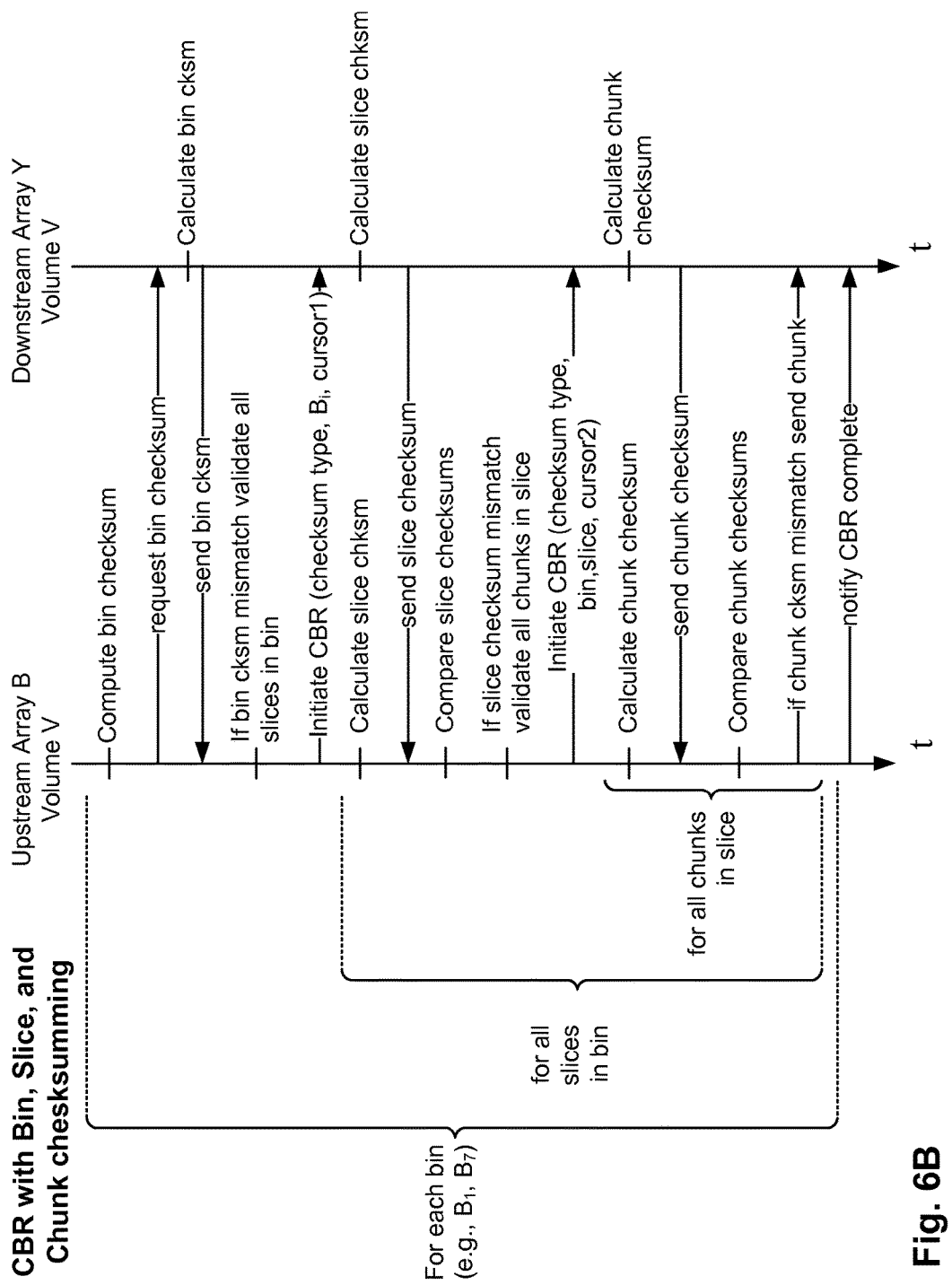
FIG. 6B illustrates the CBR process that includes checking slice checksums and checking chunk checksums, according to one embodiment.

FIG. 6B illustrates the CBR process that includes checking slice checksums and checking chunk checksums, according to one embodiment. In one embodiment, a chunk is smaller than a slice and bigger than a block and the slice is divided into chunks, and CBR is performed in two phases: a first phase for checking slice checksums and a second phase for checking chunk checksums. This way, instead of having to send the completed slice, only the data that is incorrect for one or more chunks is retransmitted, saving CPU and network resources.

In general, CBR may be applied to multiple levels of checksums, but not all levels need to be utilized for a particular implementation. The levels may include calculating checksums for the volume, the bins in the volume, the slices in the bins, the chunks in the slices, or at the block level.

Further, it is noted that some of the checksums may already be available and pre-calculated, as the system may keep checksums for a slice, or a bin, or a block etc. Therefore, CBR is modified to utilize the already available checksums instead of having to calculate the checksums during the CBR process.

In FIG. 6B, the checksum of each bin is calculated first, and if the bin checksums do not match then slice validation is started, to validate all slices in the bin. For each slice, the upstream and downstream arrays calculate the checksum of the slice being validated. If the slice checksums match, then the slice is validated. If the slice checksums do not match, then validation by chunk is started.

To validate the slice, all the chunks in the slice are validated. For each chunk been validated, the upstream array and the downstream array calculate respective chunk checksums. If the checksums match, then the chunk is validated. If the checksums do not match, then the data for the chunk is sent from the upstream array to the downstream array. After the data is sent, a new check is performed to validate that the data sent was correctly replicated, and if so, the chunk is considered validated. After all chunks are validated, the slice is considered validated, and after all the slices are validated, then the bin is considered validated. Further, when all the bins of a volume have been validated, the volume is considered validated.

Figure 7:
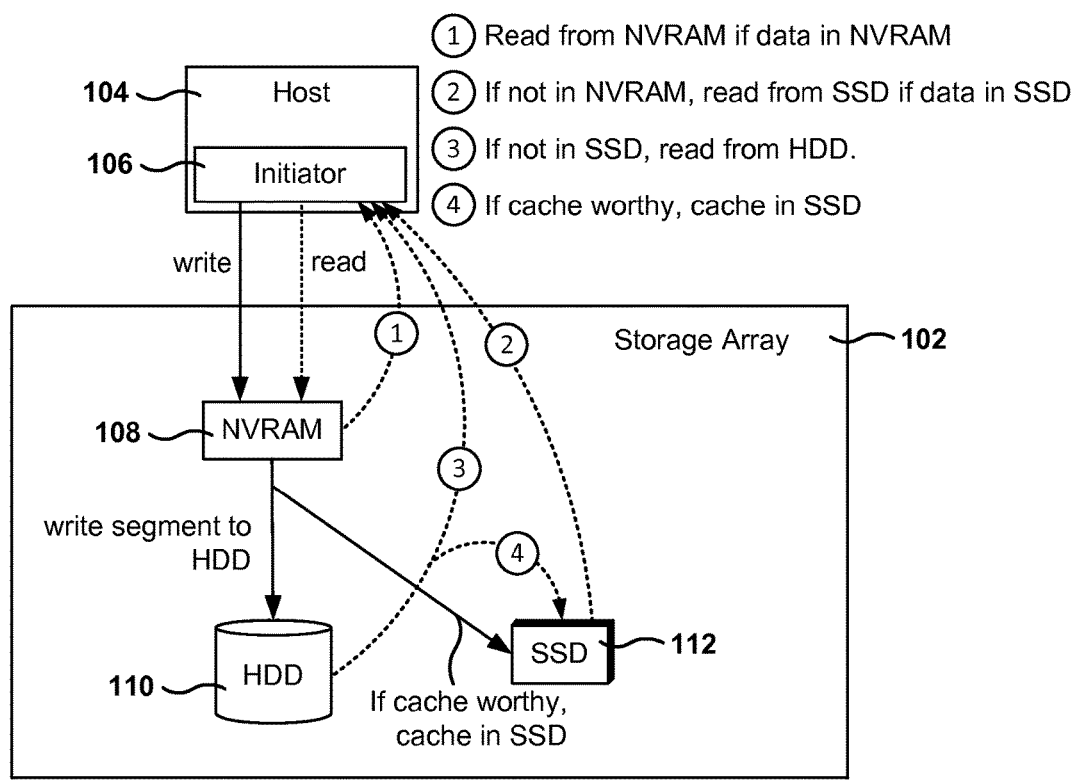
FIG. 7 illustrates the read and write paths within the storage array, according to one embodiment.

FIG. 7 illustrates the read and write paths within the storage array, according to one embodiment. Regarding the write path, the initiator 106 in the host 104 sends the write request to the storage array 102. As the write data comes in, the write data is written into NVRAM 108, and an acknowledgment is sent back to the initiator (e.g., the host or application making the request). In one embodiment, storage array 102 supports variable block sizes. Data blocks in the NVRAM 108 are grouped together to form a segment that includes a plurality of data blocks, which may be of different sizes. The segment is compressed and then written to HDD 110. In addition, if the segment is considered to be cacheworthy (i.e., important enough to be cached or likely to be accessed again) the segment is also written to the SSD cache 112. In one embodiment, the segment is written to the SSD 112 in parallel while writing the segment to HDD 110.

In one embodiment, the performance of the write path is driven by the flushing of NVRAM 108 to disk 110. With regards to the read path, the initiator 106 sends a read request to storage array 102. The requested data may be found in any of the different levels of storage mediums of the storage array 102. First, a check is made to see if the data is found in RAM (not shown), which is a shadow memory of NVRAM 108, and if the data is found in RAM then the data is read from RAM and sent back to the initiator 106. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 112 and sent to the initiator 106. If the data is not found in the NVRAM 108 nor in the flash cache 112, then the data is read from the hard drives 110 and sent to the initiator 106. In addition, if the data being served from hard disk 110 is cache worthy, then the data is also cached in the SSD cache 112.

Figure 8:
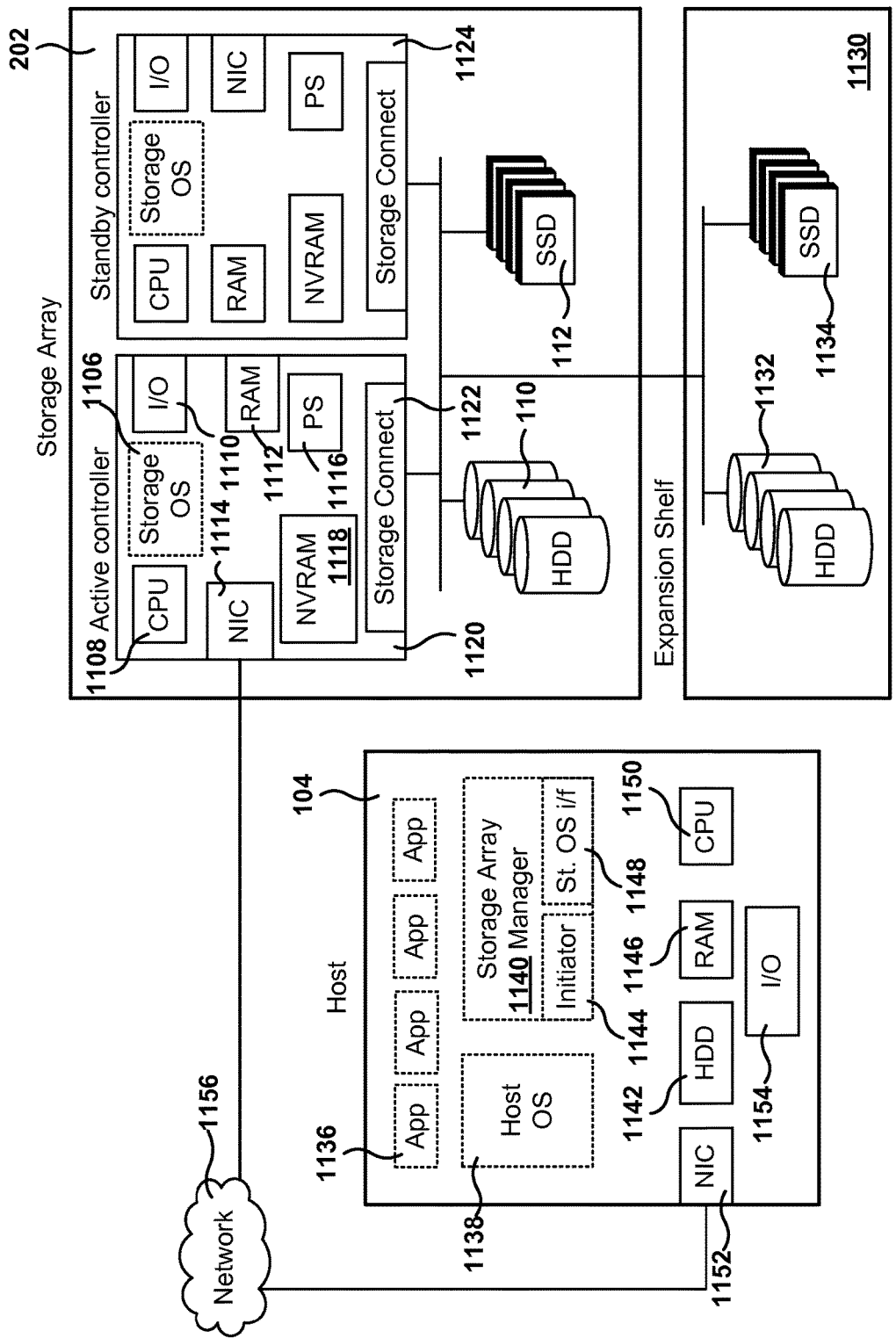
FIG. 8 illustrates the architecture of a storage array, according to one embodiment.

FIG. 8 illustrates the architecture of a storage array, according to one embodiment. In one embodiment, storage array 102 includes an active controller 1120, a standby controller 1124, one or more HDDs 110, and one or more SSDs 112. In one embodiment, the controller 1120 includes non-volatile RAM (NVRAM) 1118, which is for storing the incoming data as the data arrives to the storage array. After the data is processed (e.g., compressed and organized in segments (e.g., coalesced)), the data is transferred from the NVRAM 1118 to HDD 110, or to SSD 112, or to both.

In addition, the active controller 1120 further includes CPU 1108, general-purpose RAM 1112 (e.g., used by the programs executing in CPU 1108), input/output module 1110 for communicating with external devices (e.g., USB port, terminal port, connectors, plugs, links, etc.), one or more network interface cards (NICs) 1114 for exchanging data packages through network 1156, one or more power supplies 1116, a temperature sensor (not shown), and a storage connect module 1122 for sending and receiving data to and from the HDD 110 and SSD 112. In one embodiment, standby controller 1124 includes the same components as active controller 1120.

Active controller 1120 is configured to execute one or more computer programs stored in RAM 1112. One of the computer programs is the storage operating system (OS) used to perform operating system functions for the active controller device. In some implementations, one or more expansion shelves 1130 may be coupled to storage array 102 to increase HDD 1132 capacity, or SSD 1134 capacity, or both.

Active controller 1120 and standby controller 1124 have their own NVRAMs, but they share HDDs 110 and SSDs 112. The standby controller 1124 receives copies of what gets stored in the NVRAM 1118 of the active controller 1120 and stores the copies in its own NVRAM. If the active controller 1120 fails, standby controller 1124 takes over the management of the storage array 102. When servers, also referred to herein as hosts, connect to the storage array 102, read/write requests (e.g., IO requests) are sent over network 1156, and the storage array 102 stores the sent data or sends back the requested data to host 104.

Host 104 is a computing device including a CPU 1150, memory (RAM) 1146, permanent storage (HDD) 1142, a NIC card 1152, and an IO module 1154. The host 104 includes one or more applications 1136 executing on CPU 1150, a host operating system 1138, and a computer program storage array manager 1140 that provides an interface for accessing storage array 102 to applications 1136. Storage array manager 1140 includes an initiator 1144 and a storage OS interface program 1148. When an IO operation is requested by one of the applications 1136, the initiator 1144 establishes a connection with storage array 102 in one of the supported formats (e.g., iSCSI, Fibre Channel, or any other protocol). The storage OS interface 1148 provides console capabilities for managing the storage array 102 by communicating with the active controller 1120 and the storage OS 1106 executing therein.

To process the IO requests, resources from the storage array 102 are required. Some of these resources may be a bottleneck in the processing of storage requests because the resources are over utilized, or are slow, or for any other reason. In general, the CPU and the hard drives of the storage array 102 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

The hard disks may also become a bottleneck because the inherent access speed to data is slow when compared to accessing data from memory (e.g., NVRAM) or SSD. Embodiments presented herein are described with reference to CPU and HDD bottlenecks, but the same principles may be applied to other resources, such as a system with insufficient amount of NVRAM.

As used herein, SSDs functioning as flash cache, should be understood to operate the SSD as a cache for block level data access, providing service to read operations instead of only reading from HDDs 110. Thus, if data is present in SSDs 112, reading will occur from the SSDs instead of requiring a read to the HDDs 110, which is a slower operation. As mentioned above, the storage operating system 1106 is configured with an algorithm that allows for intelligent writing of certain data to the SSDs 112 (e.g., cache-worthy data), and all data is written directly to the HDDs 110 from NVRAM 1118.

The algorithm, in one embodiment, is configured to select cache-worthy data for writing to the SSDs 112, in a manner that provides in increased likelihood that a read operation will access data from SSDs 112. In some embodiments, the algorithm is referred to as a cache accelerated sequential layout (CASL) architecture, which intelligently leverages unique properties of flash and disk to provide high performance and optimal use of capacity. In one embodiment, CASL caches "hot" active data onto SSD in real time—without the need to set complex policies. This way, the storage array can instantly respond to read requests—as much as ten times faster than traditional bolt-on or tiered approaches to flash caching.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In some implementations, SSDs 112 may be referred to as flash, or flash cache, or flash-based memory cache, or flash drives, storage flash, or simply cache. Consistent with the use of these terms, in the context of storage array 102, the various implementations of SSD 112 provide block level caching to storage, as opposed to instruction level caching. As mentioned above, one functionality enabled by algorithms of the storage OS 1106 is to provide storage of cache-worthy block level data to the SSDs, so that subsequent read operations are optimized (i.e., reads that are likely to hit the flash cache will be stored to SSDs 12, as a form of storage caching, to accelerate the performance of the storage array 102).

In one embodiment, it should be understood that the "block level processing" of SSDs 112, serving as storage cache, is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

In the various implementations described herein, the storage caching facilitated by SSDs 112 is implemented by algorithms exercised by the storage OS 1106, which can differentiate between the types of blocks being processed for each type of application or applications. That is, block data being written to storage 1130 can be associated with block data specific applications. For instance, one application may be a mail system application, while another application may be a financial database application, and yet another may be for a website-hosting application. Each application can have different storage accessing patterns and/or requirements. In accordance with several embodiments described herein, block data (e.g., associated with the specific applications) can be treated differently when processed by the algorithms executed by the storage OS 1106, for efficient use of flash cache 112.

Figure 9:
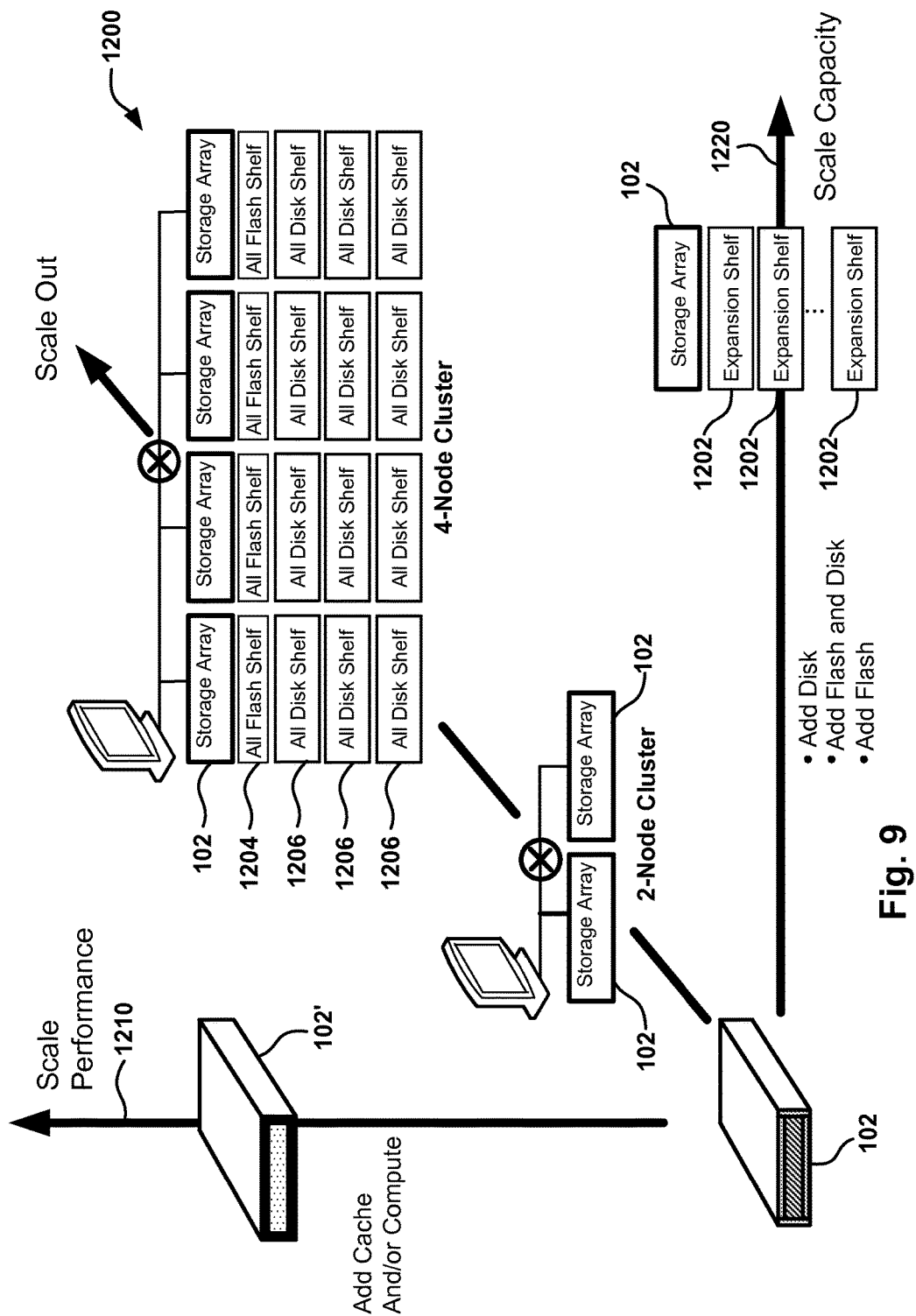
FIG. 9 is an example of the flexibility of the storage array, which can be expanded for scaling performance and for scaling capacity.

FIG. 9 is an example of the flexibility of the storage array, which can be expanded for scaling performance and for scaling capacity. In this illustration, the storage array can be adjusted to add cache and/or compute resources to define a more powerful storage array 102'. In one example, instead of upgrading the storage array 102, an upgraded storage array 102 can take its place to provide additional processing power (e.g., more powerful CPUs, higher capacity NVRAM, higher capacity DRAM, improved storage enclosure routing and buses, improved fan speeds, modified enclosure (e.g., chassis) heights (U1, U2, U3, etc.), different power supplies, and/or other redundancy and/or memory and/or processing infrastructure.

In one embodiment, if the storage array requires additional disk or storage or flash storage memory, the storage array can be expanded to scale out 1220 by adding expansion shelves 1202 to the storage array 102. As discussed above, the expansion shelves 1202 may be defined by all-disk shelves (ADS) 1206 or all-flash shelves (AFS) 1204, or combinations of ADS and AFS shelves.

In a further example, the flexibility of the storage array 102 is shown by its ability to be clustered into various sizes, which take into consideration both the scaling of performance and the scaling of capacity, which is referred to herein as "scaling-out" or "scale-out" of the storage array implementation. As shown, if additional processing power is required and additional storage capacity is required, storage arrays can be clustered together, such as to define a two-node cluster. In other embodiments, if an increased level of storage is required and processing power, multiple storage arrays can be clustered together, such as in the example of a four-node cluster.

The four-node cluster is provided such that each storage array is expanded by an all flash shelf 1204 and various all-disk shelves 1206. In some embodiments, fewer all-disk shelves can be coupled to each of the arrays that are clustered together. In still other embodiments, some clustered arrays may not be included in all flash shelves but only additional one or more of all-disk shelves. Still further, some embodiments may be more symmetric such as the four-node cluster example shown in FIG. 9.

Thus, the embodiments described herein enable the scaling of capacity and performance beyond the physical limitations of a single storage array by seamlessly clustering any combination of storage hybrid arrays. An advantage of clustering is that performance can be managed to avoid capacity silos and performance hotspots, and enables easy management of all hardware resources across the cluster as a single storage entity.

In one embodiment, as mentioned above, the storage OS that executes a storage algorithm is capable of taking thousands of point-in-time instant snapshots of volumes by creating a copy of the volumes' indices. Any updates to existing data or new data written to a volume are redirected to free space. In one example implementation, no performance impact due to snapshot processing is taken, as snapshots take little incremental space when only changes are maintained. This also simplifies restoring snapshots, as no data needs to be copied.

Other embodiments are also provided, wherein some or all of the snapshots can be entirely and uniquely taken, wherein no incremental type snapshot is processed. Thus, it should be understood that a variety of implementations and modifications can be made and still enable the snapshot management to be processed by the storage OS of the storage array 102, in accordance with one or more embodiments. In another embodiment, processing by the storage OS enables efficient replication of data to another array by transferring compressed, block-level changes only. These remote copies can be made active if the primary array becomes unavailable. This makes deploying disaster data recovery easy and affordable—especially over a WAN to a remote array where bandwidth is limited.

Figure 10:
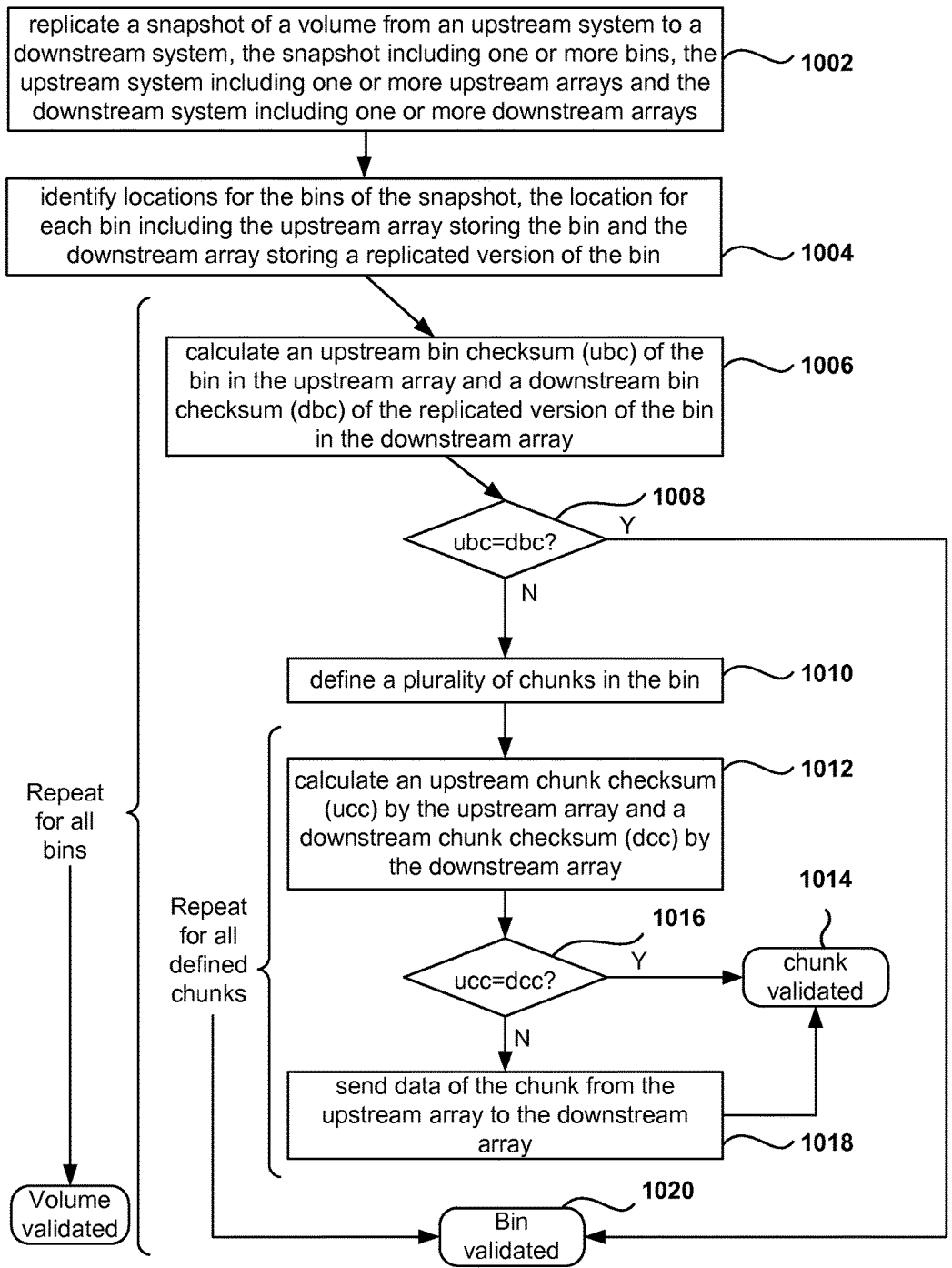
FIG. 10 is a flow chart of a method for replicating data across storage systems in a scale out configuration, according to one embodiment.

FIG. 10 is a flow chart of a method for replicating data across storage systems in a scale out configuration, according to one embodiment. While the various operations in this flowchart are presented and described sequentially, one of ordinary skill will appreciate that some or all of the operations may be executed in a different order, be combined or omitted, or be executed in parallel.

In operation 1002, a snapshot of a volume is replicated from an upstream system to a downstream system, the volume being a predefined logical storage area, the snapshot including one or more bins, the upstream system including one or more upstream arrays, and the downstream system including one or more downstream arrays.

From operation 1002, the method flows to operation 1004 for identifying the locations of the bins of the snapshot, where the location for each bin includes the upstream array storing the bin and the downstream array storing a replicated version of the bin. From operation 1004, the method flows to operation 1006, where each bin is validated by comparing an upstream bin checksum (ubc) of the bin calculated by the corresponding upstream array with a downstream bin checksum (dbc) of the replicated version of the bin calculated by the corresponding downstream array.

In operation 1008, a check is made to determine if ubc is equal to dbc. If ubc is equal to dbc, the method flows to operation 1020 where the bin is considered validated. If ubc is not equal to dbc, the method flows to operation 1010, where a plurality of chunks is defined within the bin.

From operation 1010, the method flows to operation 1012 for comparing an upstream chunk checksum (ucc) calculated by the upstream array with a downstream chunk checksum (dcc) calculated by the downstream array. In operation 1016, a check is made to determine if ucc is equal to dcc, and if ucc is equal to dcc the method flows to operation 1014, where the chunk is considered validated. If ucc is not equal to dcc, the method flows to operation 1018, where the data of the chunk is sent from the upstream array to the downstream array. From operation 1018, the method flows to operation 1014.

Operations 1012, 1016, 1014, and 1018 are repeated for all the chunks defined in operation 1010. When all the chunks have been validated, the bin is considered validated 1020. Further, operations 1006, 1008, 1012, 1016, 1014, and 1018 are repeated for all bins, and when all the bins of the volume have been validated, then the volume is considered validated.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments.

The invention claimed is:

1. A method for replicating data across storage systems, the method comprising:
    replicating, by a first processor, a snapshot of a volume from an upstream system to a downstream system, the volume being a predefined logical storage area, the snapshot including one or more blocks and one or more bins, wherein data from the snapshot is accessed by a host in units of a size of the block, the upstream system including one or more upstream arrays and the downstream system including one or more downstream arrays;
    storing, by the first processor, checksums of blocks of the snapshot in the one or more upstream arrays;
    identifying, by the first processor, locations for the bins of the snapshot, the location for each bin including the upstream array storing the bin and the downstream array storing a replicated version of the bin;
    validating, by the first processor, each bin by comparing an upstream bin checksum of the bin calculated by the corresponding upstream array with a downstream bin checksum of the replicated version of the bin calculated by the corresponding downstream array;
    in response to the upstream bin checksum being different from the downstream bin checksum, defining, by the first processor, a plurality of chunks in the bin; and
    for each chunk in the bin,
        calculating, by the first processor, the upstream chunk checksum based on the checksums of the blocks in the chunk, wherein the chunk is not uncompressed to calculate the upstream chunk checksum;
        comparing, by the first processor, an upstream chunk checksum calculated by the upstream array with a downstream chunk checksum calculated by the downstream array; and
        sending, by the first processor, from the upstream array to the downstream array, data of the chunk in response to the upstream chunk checksum being different from the downstream chunk checksum.

2. The method as recited in claim 1, wherein data of the volume is striped across the one or more bins, wherein a unit for striping the volume is a slice, wherein each bin includes one or more slices, wherein each slice includes one or more chunks, and wherein each chunk includes one or more blocks.

3. The method as recited in claim 1, further including:
    exchanging, before defining the plurality of chunks, transfer parameters between the upstream array and the downstream array for the corresponding bin, the transfer parameters including one or more of checksum type for calculating the upstream chunk checksum and the downstream chunk checksum, or a checksum size, or a chunk size, or a cursor indicating at what chunk to start the comparing of the upstream chunk checksum and the downstream chunk checksum.

4. The method as recited in claim 3, further including:
    starting comparing the upstream chunk checksum with the downstream chunk checksum at the chunk indicated by the cursor.

5. The method as recited in claim 1, wherein comparing the upstream chunk checksum with the downstream chunk checksum further includes:
   calculating, by the upstream array, the upstream chunk checksum;
   sending, from the upstream array to the downstream array, a request to get the downstream chunk checksum;
   calculating, by the downstream array, the downstream chunk checksum;
   sending the downstream chunk checksum to the upstream array; and
   comparing, by the upstream array, the upstream chunk checksum with the downstream chunk checksum.

6. The method as recited in claim 1, wherein replicating the snapshot further includes:
   for each upstream array having one or more bins of the snapshot,
      identifying, for each bin in the upstream array, a corresponding downstream array to store the replicated version of the bin; and
      transferring all data of each bin from the upstream array to the corresponding downstream array.

7. The method as recited in claim 1, wherein each upstream array is a first storage system that includes the first processor, a first volatile memory, and a first permanent storage, wherein each downstream array is a second storage system that includes a second processor, a second volatile memory, and a second permanent storage, wherein a volume holds data for a single accessible storage area, wherein data of the volume is accessible by the host in communication with the storage system.

8. The method as recited in claim 1, further including:
   after sending data of the chunk from the upstream array to the downstream array, sending, from the upstream array to the downstream array, a confirmation message indicating that the chunk has been validated; and
   after validating all chunks in the bin, sending, from the upstream array to the downstream array, a confirmation message indicating that the bin has been validated.

9. The method as recited in claim 1, further including:
   calculating the checksums of blocks of the snapshot while the blocks are uncompressed; and
   compressing the chunks following storage of the checksums of the blocks.

10. The method as recited in claim 9, wherein a chunk includes a plurality of blocks, wherein data from the chunk is not directly addressable by the host.

11. An apparatus comprising:
   a processor; and
   a memory on which is stored machine readable instructions that when executed by the processor, cause the processor to:
      transfer a snapshot of a volume from an upstream array to a downstream array, the volume being a predefined logical storage area, the snapshot including one or more blocks, wherein data from the snapshot is accessed by a host in units of a size of the block;
      store checksums of blocks of the snapshot in the upstream array;
      determine whether an upstream snapshot checksum of the snapshot in the upstream array differs from a downstream snapshot checksum of the snapshot in the downstream array; and
      in response to the upstream snapshot checksum being different from the downstream snapshot checksum, define a plurality of chunks in the snapshot in the upstream array; and
      for each chunk in the defined plurality of chunks,
         calculate the upstream chunk checksum based on the checksums of the blocks in the chunk, wherein the chunk is not uncompressed to calculate the upstream chunk checksum;
         determine whether an upstream chunk checksum calculated by the upstream array with a downstream chunk checksum calculated by the downstream array; and
         send, from the upstream array to the downstream array, data of the chunk in response to the upstream chunk checksum being different from the downstream chunk checksum.

12. The apparatus as recited in claim 11, wherein the instructions are further to cause the processor to:
   send, from the upstream array to the downstream array, a request to get the downstream chunk checksum;
   calculate, by the downstream array, the downstream chunk checksum;
   send the downstream chunk checksum to the upstream array; and
   compare the upstream chunk checksum with the downstream chunk checksum.

13. The apparatus as recited in claim 11, wherein the instructions are further to cause the processor to:
   exchange transfer parameters between the upstream array and the downstream array for the corresponding bin, the transfer parameters including one or more of checksum type for calculating the upstream chunk checksum and the downstream chunk checksum, or a checksum size, or a chunk size, or a cursor indicating at what chunk to start the comparing of the upstream chunk checksum and the downstream chunk checksum.

14. The apparatus as recited in claim 11, wherein the instructions are further to cause the processor to:
   calculate the checksums of blocks of the snapshot while the blocks are uncompressed; and
   compress the chunks following storage of the checksums of the blocks.

15. The apparatus as recited in claim 11, wherein the instructions are further to cause the processor to:
   in response to a determination that the upstream snapshot checksum does not differ from the downstream snapshot, send a confirmation message indicating that the snapshot has been validated.

16. A non-transitory computer-readable storage medium storing a computer program for replicating data across storage systems, the computer-readable storage medium comprising instructions, that when executed by a processor, cause the processor to:
   replicate a snapshot of a volume from an upstream array to a downstream array, the volume being a predefined logical storage area, the snapshot including one or more blocks, wherein data from the snapshot is accessed by a host in units of a size of the block;
   store checksums of blocks of the snapshot in the upstream array;
   determine whether an upstream snapshot checksum of the snapshot in the upstream array differs from a downstream snapshot checksum of the snapshot in the downstream array;
   in response to the upstream snapshot checksum being different from the downstream snapshot checksum, define a plurality of chunks in the snapshot in the upstream array; and
   for each chunk in the defined plurality of chunks, calculate the upstream chunk checksum based on the checksums of the blocks in the chunk, wherein the chunk is not uncompressed to calculate the upstream chunk checksum;

determine whether an upstream chunk checksum calculated by the upstream array with a downstream chunk checksum calculated by the downstream array; and send, from the upstream array to the downstream array, data of the chunk in response to the upstream chunk checksum being different from the downstream chunk checksum.

17. The storage medium as recited in claim 16, wherein the instructions are further to cause the processor to:

send, from the upstream array to the downstream array, a request to get the downstream chunk checksum;

calculate, by the downstream array, the downstream chunk checksum;

send the downstream chunk checksum to the upstream array; and compare the upstream chunk checksum with the downstream chunk checksum.

18. The storage medium as recited in claim 16, wherein the instructions are further to cause the processor to:

exchange, before defining the plurality of chunks, transfer parameters between the upstream array and the downstream array for the corresponding bin, the transfer parameters including one or more of checksum type for calculating the upstream chunk checksum and the downstream chunk checksum, or a checksum size, or a chunk size, or a cursor indicating at what chunk to start the comparing of the upstream chunk checksum and the downstream chunk checksum.

19. The storage medium as recited in claim 16, wherein the instructions are further to cause the processor to:

send from the upstream array to the downstream array, after sending data of the chunk from the upstream array to the downstream array, a confirmation message indicating that the chunk has been validated.

20. The storage medium as recited in claim 16, wherein the instructions are further to cause the processor to:

calculate the checksums of blocks of the snapshot while the blocks are uncompressed; and compress the chunks following storage of the checksums of the blocks.

* * * * *